Patented Oct. 28, 1947

2,429,799

UNITED STATES PATENT OFFICE 2,429,799

PROCESS FOR THE PREPARATION OF δ-VALEROLACTONE

John George Mackay Bremner, David Gwyn Jones, and Arthur William Charles Taylor, Norton-on-Tees, England, assignors to Imperial Chemical Industries Limited, a corporation of Great Britain No Drawing. Application April 11, 1945, Serial No. 587,836. In Great Britain April 14, 1944

4 Claims. (Cl. 260—344)

This invention relates to the preparation of δ-valerolactone.

We have found that δ-valerolactone is produced by reacting δ-hydroxyvaleric aldehyde or its isomer epoxy 1-5 pentanol-5 with oxygen at superatmospheric temperature.

The reaction can be carried out in the absence of catalysts, being slow below 80° C. but proceeding at a reasonable rate between about 90° C. and 100° C. Higher temperatures may be used with a consequent reduction in the time required. As the temperature is raised, however, there is an increasing tendency for compounds other than δ-valerolactone to be formed.

The reaction may be carried out in the presence of an oxidation catalyst. In general the oxides and salts of metals other than copper, which have more than one valency state are suitable, such as for example, cerium, cobalt, lead, manganese, chromium. When catalysts are used and the reaction is carried out in the liquid phase it is advantageous to select a catalyst which is soluble in the reaction mixture. The acetates, stearates, oleates and naphthenates of the before-mentioned metals are examples of salts which dissolve in the reaction mixture to an adequate extent.

The pressure is not critical, and the reaction may be carried out at atmospheric or increased pressure.

The reaction may be carried out in the presence of solvents such as acetic acid which dissolve δ-hydroxyvaleric aldehyde or epoxy 1-5 pentanol-5, but are not oxidised under the reaction conditions.

Example 1

Air was passed for 16 hours at the rate of 60 litres/hour as a stream of fine bubbles through 12.5 gms. of dry δ-hydroxyvaleric aldehyde at a temperature of 100° C. while stirring. On analysis the yield of δ-valerolactone was found to be 65% based on the δ-hydroxyvaleric aldehyde employed.

Example 2

Air was passed for 48 hours at the rate of 50 litres/hour as a stream of fine bubbles through a stirred mixture consisting of 200 gms. of dry δ-hydroxyvaleric aldehyde and 0.8 gms. of cobalt acetate at a temperature of 80° C.-90° C. On analysis the reaction product was found to contain 80% by weight of δ-valerolactone corresponding to a yield of 76% based on the δ-hydroxyvaleric aldehyde employed.

We claim:

1. A process for the production of δ-valerolactone which comprises reacting a substance taken from the group consisting of δ-hydroxyvaleric aldehyde and epoxy 1-5 pentanol-5 with oxygen at a temperature in the approximate range of 80° C. to 100° C.

2. A process for the production of δ-valerolactone which comprises reacting a substance taken from the group consisting of δ-hydroxyvaleric aldehyde and epoxy 1-5 pentanol-5 with oxygen at a temperature in the approximate range of 80° C. to 100° C. and in the presence of an oxidation catalyst containing a metal taken from the group consisting of cerium, cobalt, lead, manganese, and chromium.

3. The process of claim 2 in which said oxidation catalyst is a metal salt of said metals taken from the group consisting of aliphatic and alicyclic monocarboxylic acid salts.

4. The process of claim 2 in which said oxidation catalyst is a metal oxide of said metals.

JOHN GEORGE MACKAY BREMNER.
DAVID GWYN JONES.
ARTHUR WILLIAM CHARLES TAYLOR.

REFERENCES CITED

The following references are of record in the file of this patent:

Chemical Abstracts 37 (1943), p. 343, citing Barnett et al., Biochemical Journal, pages 357–363 (1942).

Chemical Abstracts 34 (1940), page 6573, citing Reichstein et al., Helvetica Chemical Acta 23, pages 650–657 (1940).